Jan. 31, 1933.  A. BÜLOW  1,895,751

STEERING GEAR FOR MOTOR VEHICLES

Filed Aug. 30, 1929

Inventor:
August Bülow

Patented Jan. 31, 1933

1,895,751

UNITED STATES PATENT OFFICE

AUGUST BÜLOW, OF STETTIN, GERMANY

STEERING GEAR FOR MOTOR VEHICLES

Application filed August 30, 1929, Serial No. 389,549, and in Germany July 17, 1928.

This invention relates to a steering gear for motor vehicles of the kind wherein a worm gear is interposed between the steering wheel and the steering rod, and the invention consists in rendering the gear yieldingly self-locking.

This is effected by mounting the worm wheel rotatably on its shaft and limiting its movements relative to the latter by rigid abutments and springs arranged so as to take the thrust.

Figure 1:
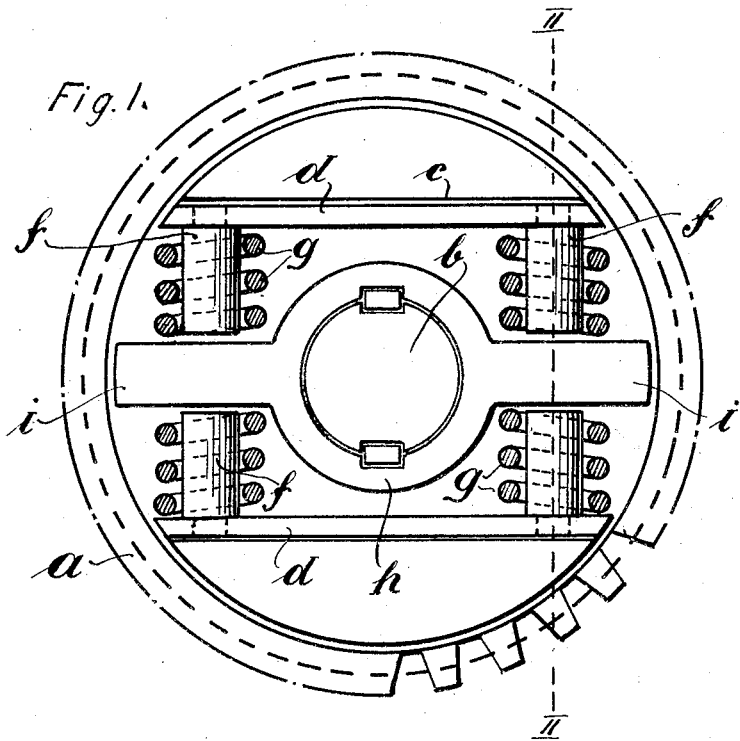
Figure 2:
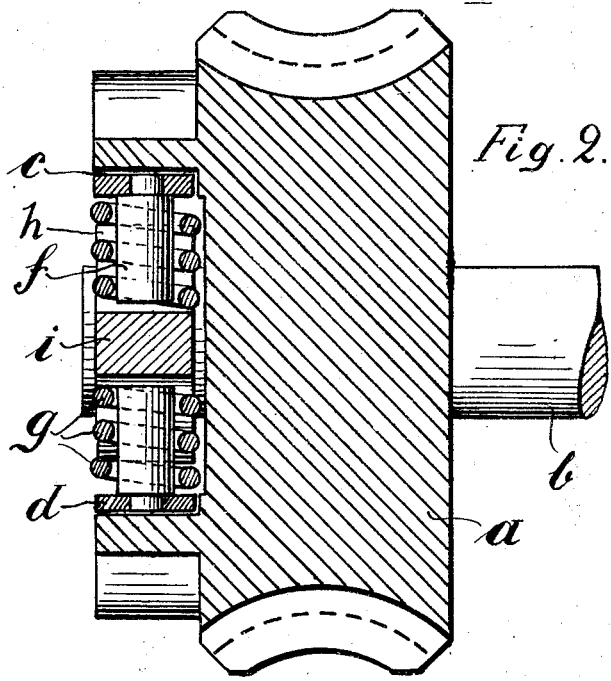

Fig. 1 of the accompanying drawing represents a section of the worm wheel taken on the line I—I of Fig. 2, and Fig. 2 is a section on the line II—II of Fig. 1.

A worm wheel $a$ which is geared to the steering wheel by means of a worm in the usual manner, is mounted rotatably on its shaft $b$, the latter being connected by means of a lever to the steering rod. Rigidly secured to the shaft $b$ is a collar $h$ which is provided with two diametrically opposite, radial arms $i$. The collar and arms are situated within a recess $c$ in a lateral extension of the wheel $a$, and each arm is located between two co-axial studs $f$ which form abutments whereby the motion of the wheel can be transmitted to the shaft $b$. The studs $f$ are mounted on plates $d$ which are placed against the shoulders formed by the recess. There is free play between the arms $i$ and the studs $f$, and the relative movement thus allowed between the wheel and the shaft is controlled by strong springs $g$ which are threaded on the studs $f$. Thus while the thrust is normally taken by the springs $g$ which absorb the shocks, the studs $f$ positively prevent the road wheels from reacting on the steering wheel so as to turn the latter.

I claim:

1. A steering gear for motor vehicles of the character described, comprising a worm wheel having diametrically opposed, lateral, segmental extensions, a shaft whereon said wheel is rotatably mounted, a collar secured to the shaft between said extensions, radial arms on said collar, studs on said extensions forming abutments for said arms and allowing a slight relative movement of wheel and shaft, and springs mounted on the studs and taking the thrust of the arms.

2. A structure as claimed in claim 1 wherein the studs are carried by plates mounted on the extensions.

AUGUST BÜLOW.